United States Patent [19]
Loce et al.

[11] Patent Number: 6,167,166
[45] Date of Patent: Dec. 26, 2000

[54] METHOD TO ENABLE THE RECOGNITION AND RENDERING OF ANTIALIASED IMAGES

[75] Inventors: Robert P. Loce, Webster; Ronald E. Jodoin, Pittsford; Peter A. Crean, Penfield; Wei Zhu, Rochester, all of N.Y.

[73] Assignee: Xerox Corporation, Stamford, Conn.

[21] Appl. No.: 09/046,414

[22] Filed: Mar. 23, 1998

[51] Int. Cl.$^7$ ..................................................... G03F 3/08
[52] U.S. Cl. ............................................ 382/266; 382/269
[58] Field of Search ...................................... 382/266–269, 382/242; 345/136, 137–138

[56] References Cited

U.S. PATENT DOCUMENTS

| | | | |
|---|---|---|---|
| 5,138,339 | 8/1992 | Curry et al. | 346/108 |
| 5,386,509 | 1/1995 | Suzuki et al. | 395/162 |
| 5,432,898 | 7/1995 | Curb et al. | 395/143 |
| 5,438,656 | 8/1995 | Valdes et al. | 395/143 |
| 5,485,289 | 1/1996 | Curry | 358/448 |
| 5,596,684 | 1/1997 | Ogletree et al. | 395/109 |
| 5,646,751 | 7/1997 | Motamed et al. | 358/518 |
| 5,673,376 | 9/1997 | Ray et al. | 395/127 |
| 5,838,334 | 11/1998 | Dye | 345/503 |
| 6,057,855 | 5/2000 | Barkans | 345/136 |

OTHER PUBLICATIONS

"A Comparison of Antialiasing Techniques," IEE CG&A, vol. 1, No. 1, Jan. 1981, pp. 40–48, F. Crow.

*Primary Examiner*—Thomas D Lee
*Assistant Examiner*—Stephen Brinich

[57] ABSTRACT

The present invention is a method for antialiased rendering (AAR) of an image. First, tagging methods for identifying antialiased pixels were described, the methods being employed separately or in concert with one another. After identifying AAR pixels, a fill order is determined and applied using a fill order algorithm that preferably employs a pixel window that is a subset of the larger window employed for pixel identification.

23 Claims, 11 Drawing Sheets

| $B_1$ | $B_2$ | $B_3$ |
|---|---|---|
| $B_4$ | $B_5$ | $B_6$ |
| $B_7$ | $B_8$ | $B_9$ |

METHOD TO ENABLE THE RECOGNITION AND RENDERING OF ANTIALIASED IMAGES

This invention relates generally to a method and apparatus to enable the printing of antialiased images and more particularly to a logic-based implementation for generating antialiased rendering tags and rendering signals within an architecture designed for the printing antialiased text or line regions.

CROSS REFERENCE

The following related applications are hereby incorporated by reference for their teachings:

"METHOD FOR GENERATING RENDERING TAGS TO FACILITATE THE PRINTING OF ANTI-ALIASED IMAGES," P. Crean et al., application Ser. No. 08/XXX,XXX, filed concurrently herewith, (D/97508);

"A METHOD OF ENCODING HIGH RESOLUTION EDGE POSITION INFORMATION IN CONTINUOUS TONE IMAGE INFORMATION," N. Zeck et al., application Ser. No. 08/XXX,XXX, filed concurrently herewith, (D/97434);

"TEXT QUALITY ENHANCEMENT VIA RESOLUTION ENHANCEMENT TECHNIQUE BASED ON SEPARATING JAGGEDNESS DETECTION AND FILTERING," R. Eschbach, application Ser. No. 08/XXX,XXX, filed Sep. 25, 1997 (D/95150); and "TAGGING OF ANTIALIASED IMAGES," R Loce et al., application Ser. No. 08/XXX,XXX, filed concurrently herewith, (D/97507Q); and "MEMORY-EFFICIENT TAGGING OF ANTI-ALIASED IMAGES," S. Harrington et al., application Ser. No. 08/XXX,XXX, filed concurrently herewith, (D/97649).

BACKGROUND AND SUMMARY OF THE INVENTION

Antialiasing in the context of digitizing line art and certain graphical image structures is best known as a method of using intermediate levels of intensity to achieve subpixel position of edges for several reasons including reduction or elimination of jaggies on the edges of lines and polygons, including text. As used herein the term antialiased is intended to refer to those segments or regions of an image that are effected by an antialiasing operation applied to the image (e.g. an image processing operation or a physical process resulting in gray pixels along the edges of line art or text). Jaggies are, primarily visible at the edges of sloped lines approaching horizontal or vertical. The term antialiasing suggests an analog term aliasing; normally representing the presence of low frequencies resulting from sampling high frequency signals at too low a sampling rate.

Consider a near-vertical (or near-horizontal) line segment. To be perfectly reproduced in a printed media, the phase, which represents the location of the edge, must continuously vary along the length of a segment. Due to the inherent sampling of a bi-level display or printed output, the phase exhibits jump discontinuities. Thus, this form of aliasing artifact, leads to an induced jagged appearance where the structures are referred to jaggies. Within a sampled image any graphical object is eventually approximated as a polygon or collection of polygons. These polygons have straight edges some of which will exhibit aliasing (jaggies and other placement defects). FIG. 1 for example shows aliasing in two dimensions. When the triangle on the top of FIG. 1 is rasterized, the edges are aliased as reproduced in the triangle shown at the bottom of FIG. 1. In particular, the position along the bottom edge should move up slightly from column to column as one looks from left to right in the image at the bottom of FIG. 1. However, the position is quantized, as illustrated, producing the jagged appearance along the bottom of the triangle. Visibility of the anti-aliased image artifacts is increased by the regular nature of the jaggies, again a result of sampling.

Consider the following systems and their capability, or incapability, to utilize antialiased pixels. Xerox's Docucolor 40, for example, employs a high frequency analog line screen to render antialiased pixels, but that is not an option for some products or marked segments. When conventional screens (e.g., approximately equal to 130–150 CPI dots) are employed in a rendering module, antialiased pixels are halftoned and printed, resulting in objectionable halftone dots positioned along character edges. Hyperacuity printing techniques, for example those described by Curry, et al. (U.S. Pat. No. 5,138,339 and U.S. Pat. No. 5,485,289) can provide rendering for antialiased pixels that is compatible with simultaneously printing dot screen halftones in enhanced line art. However, these techniques require the use of tags to identify the antialiased pixels as antialiased line art. In the preferred embodiments described with respect to the present invention the rendering architecture distinguishes text/line art from contone images to appropriately treat both image types. As will be described herein an algorithm or method may be employed in a rendering module or in other components of the rendering device to convert gray antialiased pixels to a form suitable for xerographic printing.

Antialiased images can be generated by capturing the image at a resolution greater than the final or desired output resolution, then reducing the resolution of the image by sub-sampling using an averaging process. A major benefit of antialiased images is that high contrast, saturated objects are surrounded with pixels possessing intermediate values that visually suggest the true, higher resolution position of object edges.

For example, in binary printing systems, such as many xerographic or ink jet systems that use a halftoning process to simulate continuous tone images, these antialiased edge pixels should be rendered with a very high frequency cell, ideally one having the resolution of the final output image. If the standard system halftone dot were to be used, the antialiased edges would be serrated or jagged at the standard halftone frequency. This rendering would reduce or even negate any value obtained through antialiasing. The use of a very high frequency screen over the entire antialiased image renders the antialiased pixel properly, but tends to sharpen the tonal curve and provoke print quality defects in the overall image.

Hence, the present invention is directed to a logic-based method for generating antialiased rendering tags within an architecture designed for the rendering of antialiased text or line regions, and to thereby enable the antialiased pixels to be rendered in a manner distinguishable from that applied to continuous tone portions of an image.

Heretofore, a number of patents and publications have disclosed information relevant to antialiasing, the relevant portions of which may be briefly summarized as follows:

U.S. Pat. No. 5,646,751 to Motamed et al., issued Jul. 8, 1997, teaches a method for improving the speed of a color conversion operation using pixel tagging.

In "A Comparison of Antialiasing Techniques," IEEE CG&A, Vol. 1, No. 1, Jan. 1981, pp. 40–48, F. Crow teaches that prefiltering is a computationally effective technique for antialiasing.

In accordance with the present invention, there is provided a method for processing an image including antialiased pixels therein, comprising the steps of: determining if a target pixel has been antialiased; indicating whether the target pixel has been antialiased by a tag; and determining an appropriate rendering technique for each target pixel as a function of the tag.

In accordance with another aspect of the present invention, there is provided, in a printing system, receiving document images including both text / line art regions, and pictorial regions, a method for optimizing the image rendition, comprising the steps of: receiving an image in a form suitable for processing by an antialiasing processor; processing the image in a digital front end to produce antialiased pixels therein in order to improve the rendition of such images, said processing resulting in an image data stream consisting essentially of continuous tone image pixels; and subsequently processing the continuous tone image containing antialiased pixels therein in order to identify the antialiased pixels and to process the antialiased pixels in a manner distinct from any non-antialiased pixels, including the steps of determining if a target pixel has been antialiased, indicating whether the target pixel has been antialiased by a tag, and determining an appropriate rendering technique for each target pixel as a function of its tag.

One aspect of the invention deals with a basic problem in the rendering of antialiased images, particularly text and line art regions—identifying the antialiased regions and then the appropriate technique for rendering the antialiased regions—in order to obtain acceptable edge quality. This aspect is further based on the discovery of a technique that alleviates this problem. The technique employs a rendering architecture that distinguishes between image types (binary text or lines and continuous tone), determines whether a given pixel has been antialiased, and directs the rendering operation accordingly.

BRIEF DESCRIPTION OF THE DRAWINGS

FIG. 5 is a representation of an exemplary 3×3 pixel window as employed by an embodiment of the present invention;

FIG. 7 is a representation of an exemplary 5×5 pixel window as employed by an embodiment of the present invention;

Figure 1:
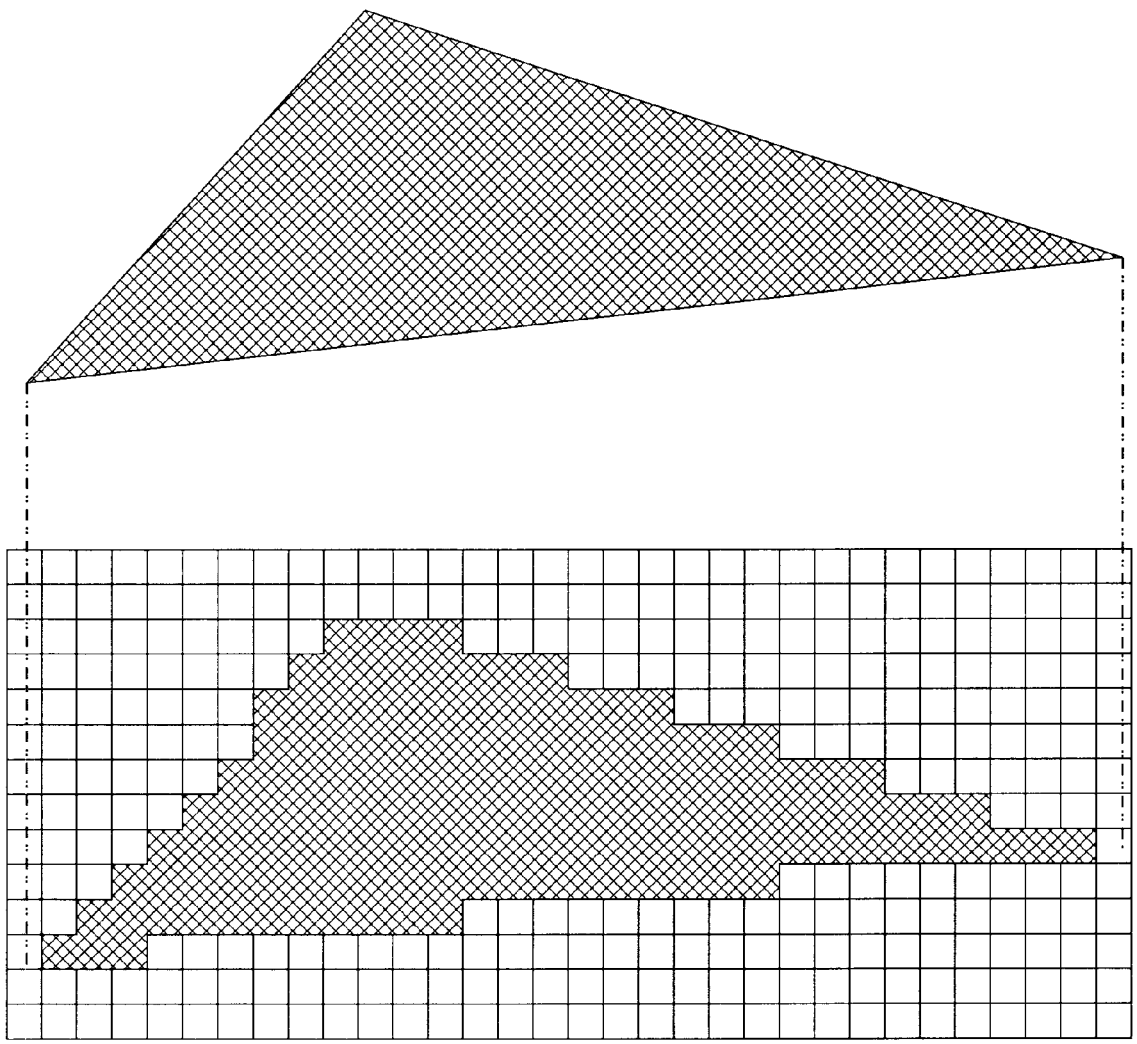
FIG. 1 is an illustration of a potential effect of aliasing in a digitized document image.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. An "image", a pattern of physical light, may include characters, words, and text as well as other features such as graphics. An image may be divided into "segments," each of which is itself an image. A segment of an image may be of any size up to and including the whole image.

Each location in an image may be called a "pixel." Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. Although described herein as continuous tone processing, the present invention applies equally as well to the processing of color images, wherein each separation is treated, effectively, as a gray scale or continuous tone image. Accordingly, references herein to the processing of continuous tone (contone) or gray scale images is intended to include the processing of color image separations as well. An operation performs "image processing" when it operates on an item of data that relates to part of an image.

An "image input device" is a device that can receive an image and provide an item of data defining a version of the image. A "scanner" is an image input device that receives an image by a scanning operation, such as by scanning a document.

An "image output device" is a device that can receive an item of data defining an image and provide or render the image as output. A "display" is an image output device that provides the output image in human viewable form.

Figure 2:
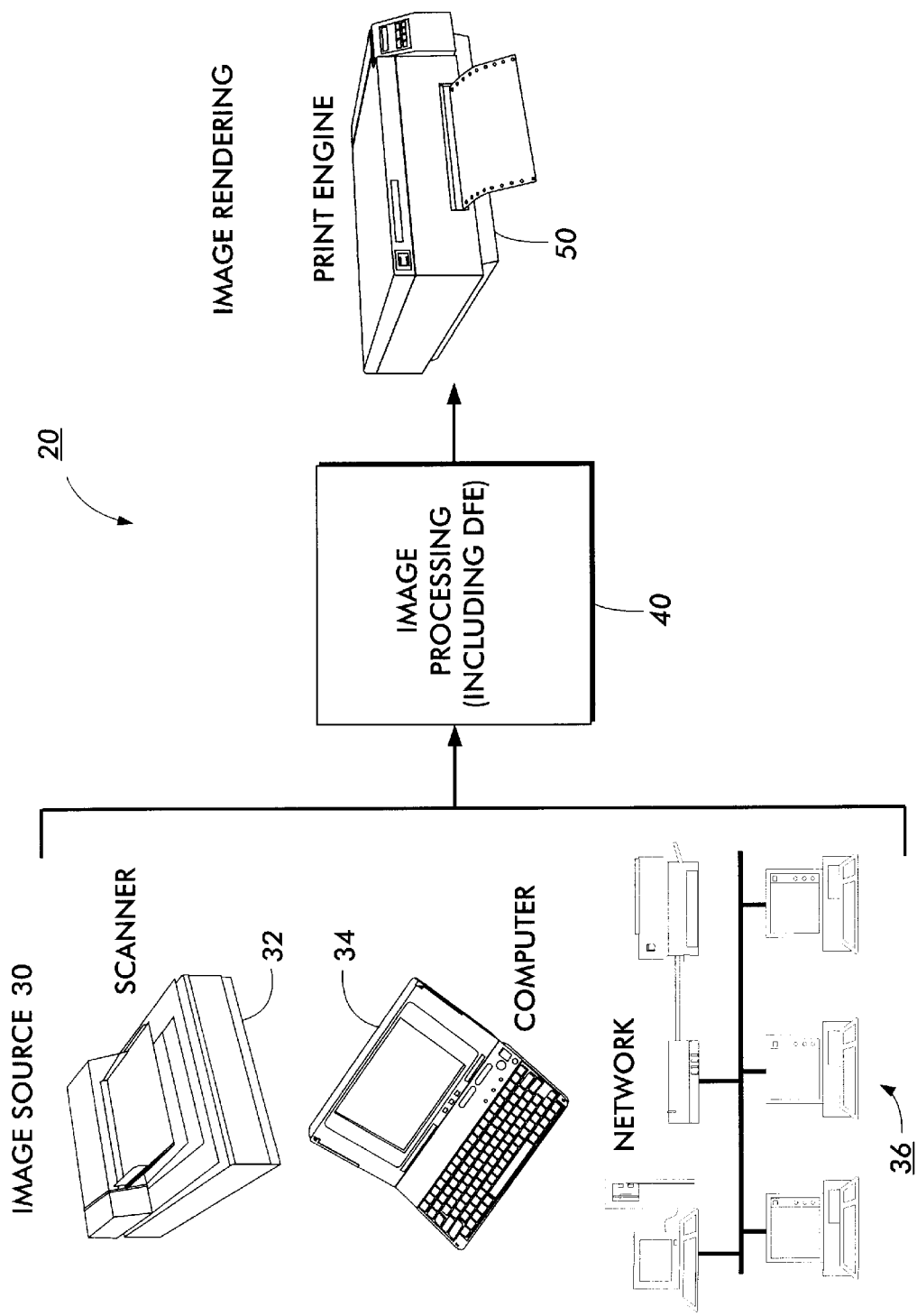
FIG. 2 is a general representation of a suitable system-level embodiment for one or more aspects of the present invention.

Turning now to FIG. 2, depicted therein is an embodiment of a preferred digital imaging system. In the system 20, image source 30 is used to generate image data that is supplied to an image processing system, that may incorporate what is known in the art as a digital front end (DFE) 40, and which produces binary data for rendering by print engine 50. For example image source 30 may include scanner 32, computer 34, network 36 or any similar or equivalent image input terminal. On the output end printer engine 50 is preferably a xerographic engine however engine 50 may include such equivalent alternatives as ink jet, etc. The present invention is directed towards aspects of image processor 40 depicted in FIG. 2. In particular, the intention of the present invention is to identify and process accordingly those pixels generated along antialiased regions of the input image.

Figure 3:
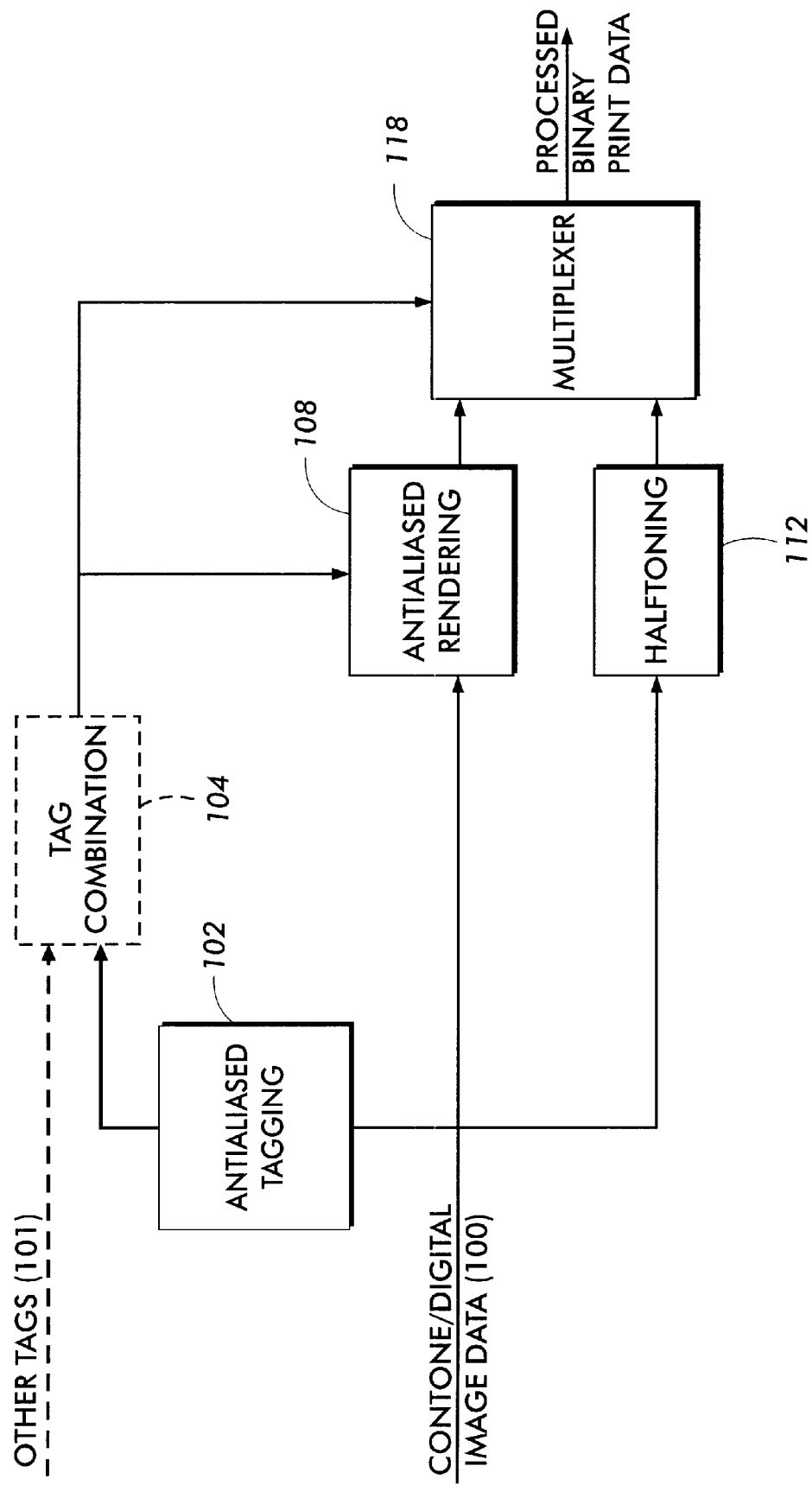
FIG. 3 is a generalized data flow representation of one embodiment of the present invention.

Referring now to FIG. 3, shown therein is a detailed diagram depicting the data flow in one embodiment of the present invention. System 40 includes a method for transforming the continuous tone (contone)/digital data into processed output data. In FIG. 3 the contone/digital image data 100 is provided to one portion of image processing system 40. In particular, the data flow of FIG. 3 depicts that portion of data that would be received from a digital front end (DFE) system having processed the raster image data, where the contone data (100) is then supplied as indicated on the leftmost side of the figure. The contone data 100 is supplied to an antialias tagging block 102, an antialiased rendering block 108, and a halftoning block 112.

The output of antialias tagging block 102 is a tag indicating a determination of whether or not the pixel in question has been antialiased in the DFE. The tag output is supplied to antialias rendering block 108 to control processing therein, and is also used as a select signal in multiplexer 118. More importantly, the tag may be a multiple-bit tag as will be described herein, and various bits therein may be employed by the different sub-processes receiving the tag data. As depicted in the figure, an alternative embodiment could also incorporate an incoming tag (other tag) 101 that provides further information, for example, pixel type (line art, text, pictorial, halftone, antialiased, etc.). The other tag could be combined with the antialiased tag within a tag combination function such as represented by operation 104. In one embodiment, the DFE may output the "other tag" indicating some attribute for a given pixel or group of pixels. That tag may be combined with the tag produced by the antialiased tagging block 102 to yield a rendering tag that possesses more information or more accurate information on a particular pixel and how it should be rendered. The combination operation carried out at 104 may be accomplished by a look-up table and the resulting tag would then be employed to direct the antialiased rendering The output of antialias rendering block 108 and halftoning block 112 are both supplied as inputs to multiplexer 118 and selection of one of the two inputs is used to produce the process binary print data that is output from multiplexer 118. Alternatively, the selection operation could be used to choose which rendering method to perform, rather than select one of a collection of output signals that have been generated.

In the following description various embodiments for the antialias tagging operations carried out in block 102 and antialias rendering in block 108 will be described. The overall antialiased image processing algorithm can be viewed conceptually as consisting of several parts:

a. determining if a given pixel has been antialiased or affected by an antialiasing operation;

b. determining the positioning order for high addressability output pixels (or pulse width position modulated (PWPM) pulse location); and c. determining the number of high addressable pixels to output (or length of PWPM pulse).

Figure 4:
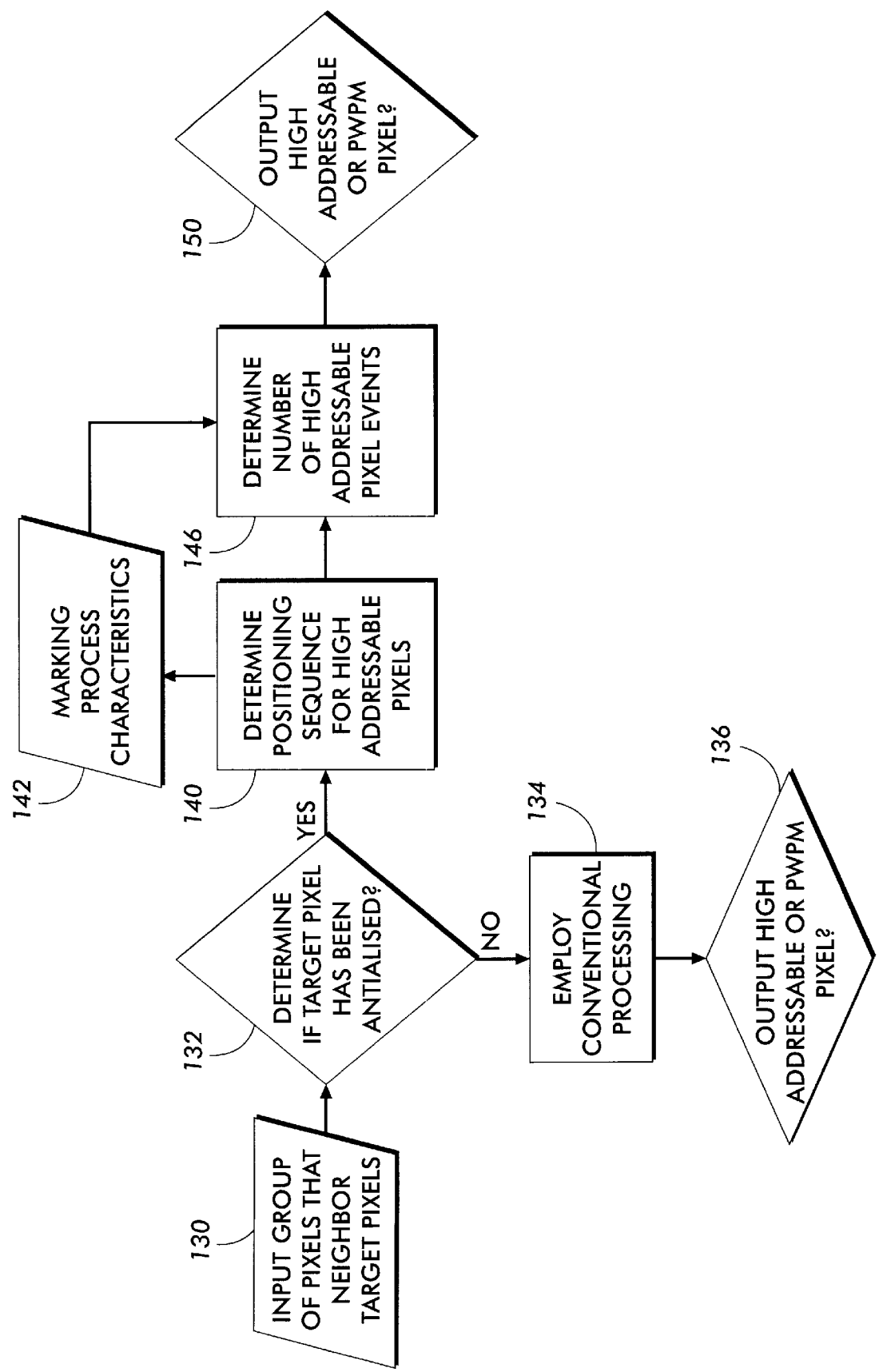
FIG. 4 is an alternate view of the architecture shown in FIG. 3.

Steps b and c can be thought of as a form of high resolution halftoning or high resolution pattern substitution. In either case, they employ tag information, pixel value information, and marking process characteristics to select the antialiased rendering signals FIG. 4 is a schematic illustration of various steps in the process (tagging & rendering) and an alternate representation of the architecture shown in FIG. 3, applied in accordance with aspects of the present invention. In particular the algorithm focuses on the processing of a pixel when it has been determined to be antialiased. Referring to FIG. 4, at block 130 the group of pixels neighboring or surrounding the target pixel are analyzed. At test block 132 a determination is made as to whether the target pixel has been antialiased. A negative determination represented by block 134 indicates that conventional processing, possibly halftoning, will be employed, and high addressable, pulse-width position-modulated (PWPM) or high-resolution halftone output pixels will be generated at block 136. An affirmative determination at block 132, will result in a subsequent operation to determine the positioning sequence for the high addressable pixel events. A pixel is considered antialiased at block 132 if it meets certain criteria. One example is of the criteria could be if: (a) it is gray (contone); and (b) it possesses at least one white neighbor and one black neighbor. Alternatively if it has been tagged previously to indicate it is an antialiased pixel it would pass through as an affirmatively identified antialiased pixel. Examination of the pixel and its neighbors can be performed by using Boolean logic operations on the pixel byte map values. Block 140 as previously noted determines a positioning sequence for high addressability pixel events. Block 140 preferably uses neighboring pixel information, and possibly marking process information, to determine if the pixel event should be shifted toward the left, shifted toward the right, or located/positioned about the center of the pixel period. The positioning may be determined by one or more of the following methods:

a. Using the centroid of neighboring black and white pixels to determine if edges tend toward vertical or horizontal, and if the antialiased pixel is left, right, above or below the edge, vertical or near vertical edges require pixel events shifted toward the edge, horizontal or near horizontal edges require pixel events shifted toward the center;

b. Use neighboring gray pixel information, shifting pulses away from gray pixels, (e.g., a horizontal edge may have left and right gray neighbors, in this case position pulses in the pixel center);

c. Use of templates or look-up tables to identify special patterns and their respective output positioning.

After determining the positioning sequence at block 140 concurrent processes 142 and 146 are executed. Block 142 notes the marking process characteristics of the antialiased image. Concerning employing marking characteristics, the signals employed to render the antialiased pixel have some effect within the output image and that effect may be thought of as the amount darkness generated, the resulting shift in an edge, or the resulting line thickness. The possible output signals must be calibrated so as to characterize the effect they generate. Then knowing their effect, a given signal can be used in the most appropriate image structure setting. This calibration process is somewhat analogous to calibrating halftone patterns to achieve certain densities for certain inputs. The present is directed toward generating certain line edge positioning with certain signals. Block 146 determines the number of high addressable pixel events. The position sequence information provided by block 146, as a function of the marking process characteristic identified in block 142, is provided to high addressable or pulse-width position-modulated pixel output 150.

In summary, the rendering step (blocks 140, 142, 146) may be thought of as a single function or means that outputs a rendering signal that yields the desired edge effect. The input information to the block is the pixel value, neighboring pixel values, tag values, and marking process characteristics. The block could operate as a pattern substitution operation or a form of high resolution halftoning.

Having generally described an architecture for the present invention, the following description further characterizes a logic-based embodiment for generating antialiased rendering (AAR) tags within the above-described architecture. The algorithms described are intended as examples of possible embodiments. Two tagging methods for identifying an antialiased pixel are described. The first is a method designed to identify gray antialiased pixels that neighbor high contrast edges. The second presents a method to identify thin lines that are gray due to antialiasing. The methods may be employed separately or in concert with one another. The first method works particularly well using a 3×3 window of context, and the second method seems to require at least a 5×5 window, although it will be appreciated that windows of different sizes and shapes may be employed in the practice of the present invention.

Determining and applying the fill order of an antialiased pixel is conceptually distinct from antialiased-pixel identification, although the concepts may be combined into one operation. Finally, a method that may be used to determine the fill order for a region is described. The fill order algorithm employs a 3×1 pixel window that is a subset of the larger window employed for pixel identification.

The logic implementations described below are presented in a low-level form and certain portions of the tagging algorithms may also be implemented in equivalent look-up tables or template matching filters. As well as optimizing the algorithms for image quality, the form of the individual algorithms may be further optimized to make them more programmable, and to facilitate downloading and to facilitate downloading of the logic expressions or algorithm parameters. The concepts described herein may be implemented in software, however the specific implementation details may differ. Print testing has shown that the methods yield high quality line-art rendering in most cases tested.

1. Tagging Gray Pixels with High Contrast Neighbors 1.1 Algorithm Concept

Due to the averaging nature of antialiasing, some image processing systems, or methods they employ, will produce gray pixels at the edges of at least some saturated strokes. The High-Contrast-Neighbors method uses the pixel values of neighbors to identify these pixels. Conceptually, the tagging algorithm operates as follows:

1) Position an observation window (e.g., 3×3) about a target pixel.
2) Determine if the target pixel possesses both types of saturated (black and white) neighbors within that window.
3) If both saturated neighbors are present, tag that pixel for antialiased rendering. Otherwise the default tag specifies to use the system halftone dot.

The logic-based implementation is described next. Then the logical outputs of the various steps are combined to produce an antialiased rendering (AAR) tag.

1.2 Logic-Based Tagging Implementation Using a M×N Window

Figure 5:
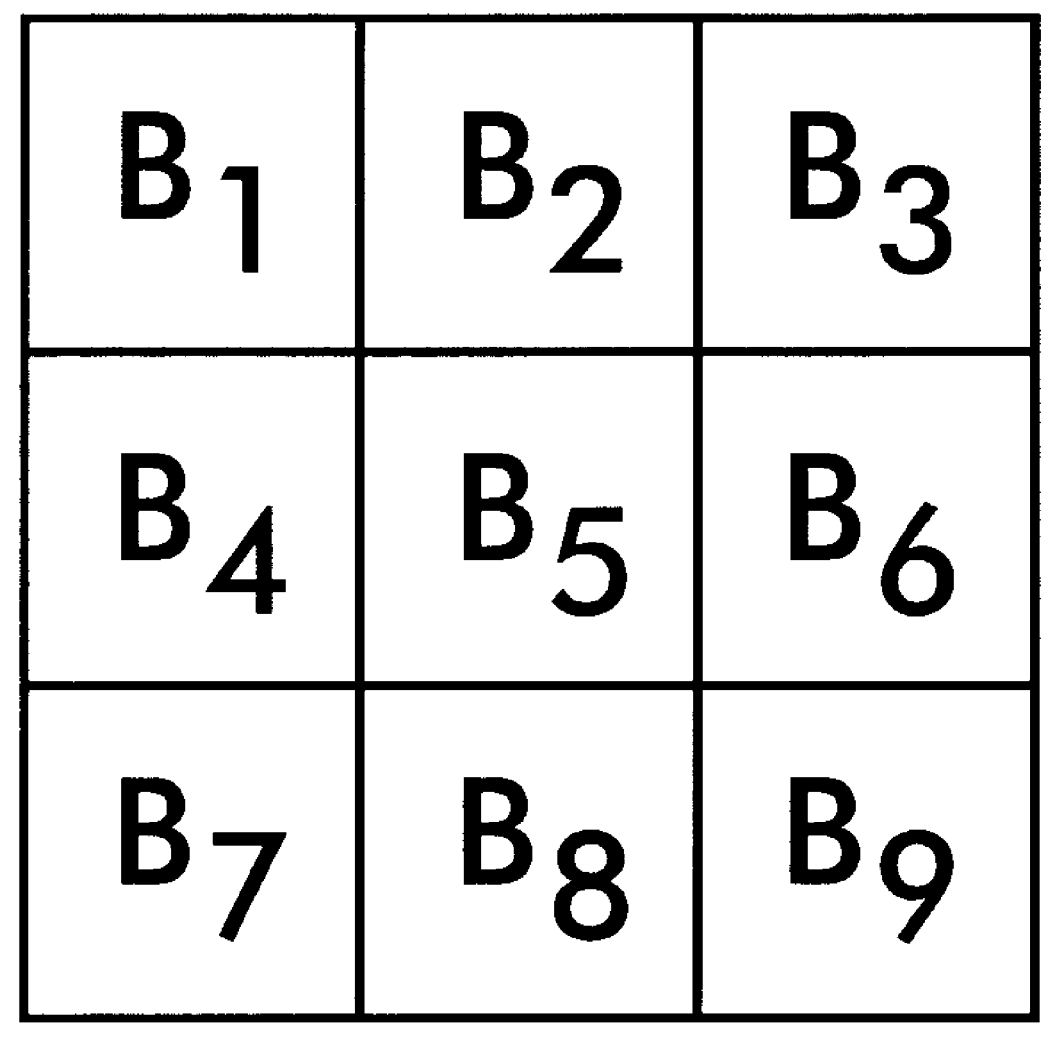

Let $B_1, B_2, \ldots, B_9$ be the byte values within a 3×3 pixel window as depicted in FIG. 5 (where for purposes of illustration M=3 and N=3) centered about the target pixel with value $B_5$, which is the target pixel for the tagging calculation. Note that the method is not limited to a 3×3 window. Let $x_{i,1}, x_{i,2}, \ldots, x_{i,8}$ denote the bits that compose the byte value of the pixel. Let $x_{i,8}$ be the high bit of the number. That is, $B_i$ is a decimal number that can be represented by the binary number $x_{i,8}x_{i,7} \ldots x_{i,1}$.

To determine if the target pixel is gray:

It is not necessary to determine if a pixel is gray to process it using AAR because either AAR or conventional halftoning could properly treat black and white pixels. The gray determination step is described here only as peripheral information that may be useful for some AAR architectures. Define a logical variable G, where G is 1 or 0 if the pixel is gray or saturated, respectively $$\text{Let } G = (x_{5,1}x_{5,2}\Lambda x_{5,8}) \Delta (x_{5,1}+x_{5,2}+\Lambda+x_{5,8}), \tag{1}$$

where multiply means AND, "+" means OR, and $\Delta$ the symmetric difference (XOR). If the pixel must be sufficiently gray (far enough from 0 or 255), then the lowest order bit(s) could be left out of the calculation or some other thresholding function could be employed.

To determine if the target pixel has a black neighbor:

Define a logical variable $N_K$, where $N_K$ is 1 or 0 if a black neighbor exists or does not exist, respectively. Form the following logical sum of products:

$$N_K = \sum_{(i=1 \wedge 9, i \neq 5)} x_{i,1} x_{i,2} \wedge x_{i,8}. \tag{2}$$

Products (ANDs) are taken over the bits within the bytes, and the results of the products are ORed. If a neighboring pixel needs to be sufficiently black (close enough to 255) instead of strictly saturated black (255) then, again, the lowest order bit(s) could be left out of the calculation or an alternative thresholding function employed.

To determine if the target pixel has a white neighbor:

Define a logical variable $N_w$, where $N_w$ is 1 or 0 if a white neighbor exists or does not exist, respectively. Perform the following logical sum $$N_W = \sum_{(i=1 \wedge 9, i \neq 5)} \left( \sum_{(i=1 \wedge 8)} x_{i,j} \right)^c. \tag{3}$$

Sums (ORs) are taken over the bits within the bytes, and the result of the sums are complimented (inverted-denoted by "$^c$"), and then ORed. If a neighboring pixel needs to be sufficiently white (close enough to 0), instead of strictly saturated white (0) then the lowest order bit(s) could be left out of the calculation or an alternative thresholding method employed.

To determine if a pixel must be treated by AAR:

Define a logical variable $AAR_1$, where $AAR_1$ is 1 or 0 if antialiased rendering is to be applied or not, respectively. Form the following logical product $$AAR_1 = GN_KN_W. \tag{4}$$

Note again, the logical variable G may not be needed by most AAR architectures.

Figure 6:
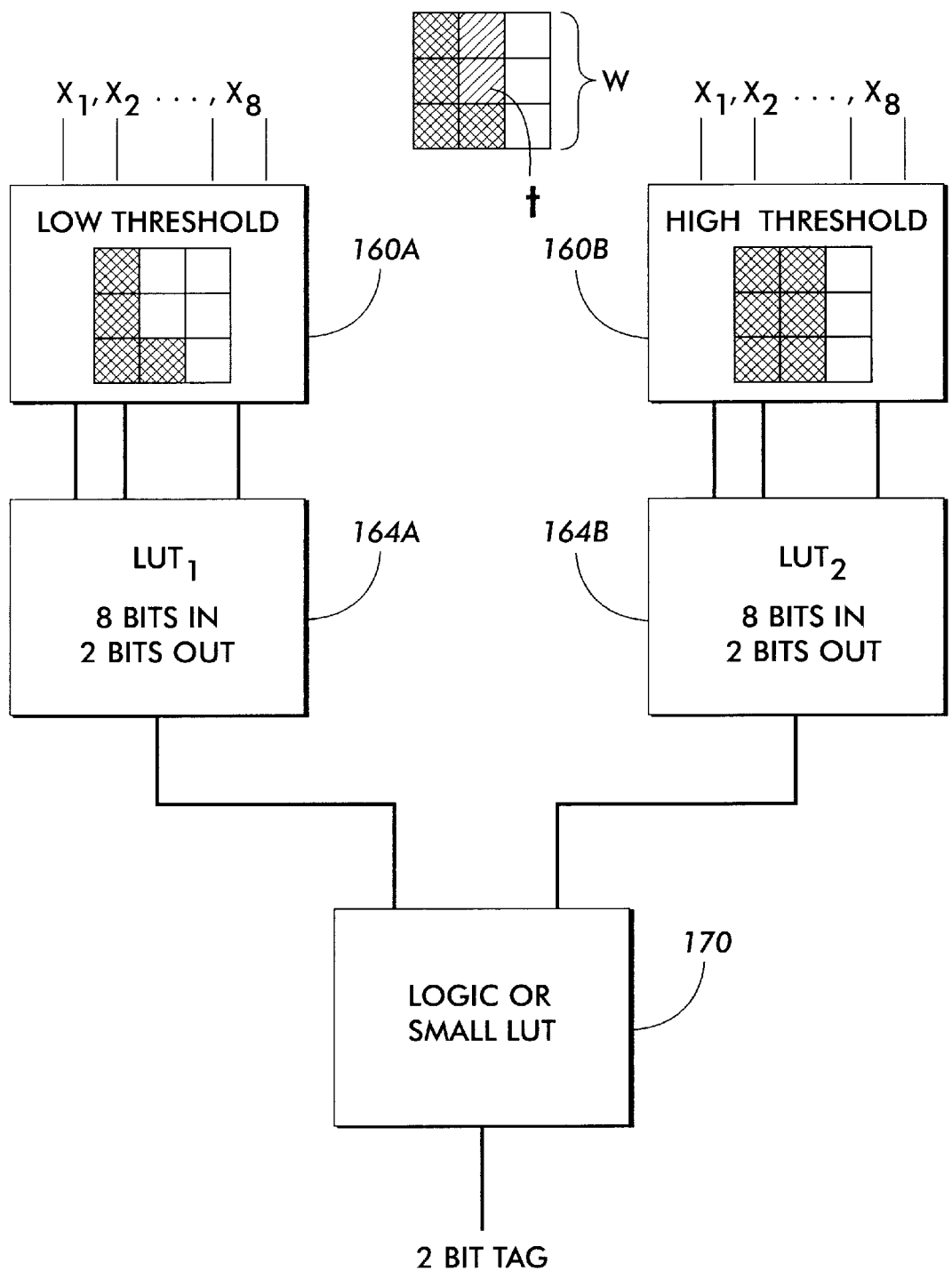
FIG. 6 shows one look-up table embodiment for tagging antialiased pixels that occur along saturated or near-saturated edges.

One possible embodiment for the logic-based implementation described above is illustrated in FIG. 6. As shown the gray edge pixel algorithm may be implemented for gray level pixels with saturated or nearly saturated neighbors using a thresholding operation, in combination with a subsequent look-up procedure (LUT) applied to the thresholded result. In particular, the pixels within the observation W window may be thresholded at a first step 160A, 160B by distinct thresholds (low and high respectively), which may be chosen adaptively based upon observed image values. The high threshold produces windowed patterns that are black or not black, while the low threshold produces windowed patterns that are white or not white. The result of the thresholding operation (preferably an 8-bit vector as the target pixel value is not included) is "filtered" through template-based look-up tables 164A or 164B to produce a pair of 2-bit outputs which are then further processed using some combinatorial logic 170 (or a small look-up table) to generate the 2-bit tag. The look-up table method allows for a simple programmable architecture where table entries can be varied for particular needs. Note that the above-described logic can be reduced to look-up table form using straightforward logic manipulation.

2. Tagging Thin, Gray, Antialiased Lines

2.1 Algorithm Concept

Figure 9:
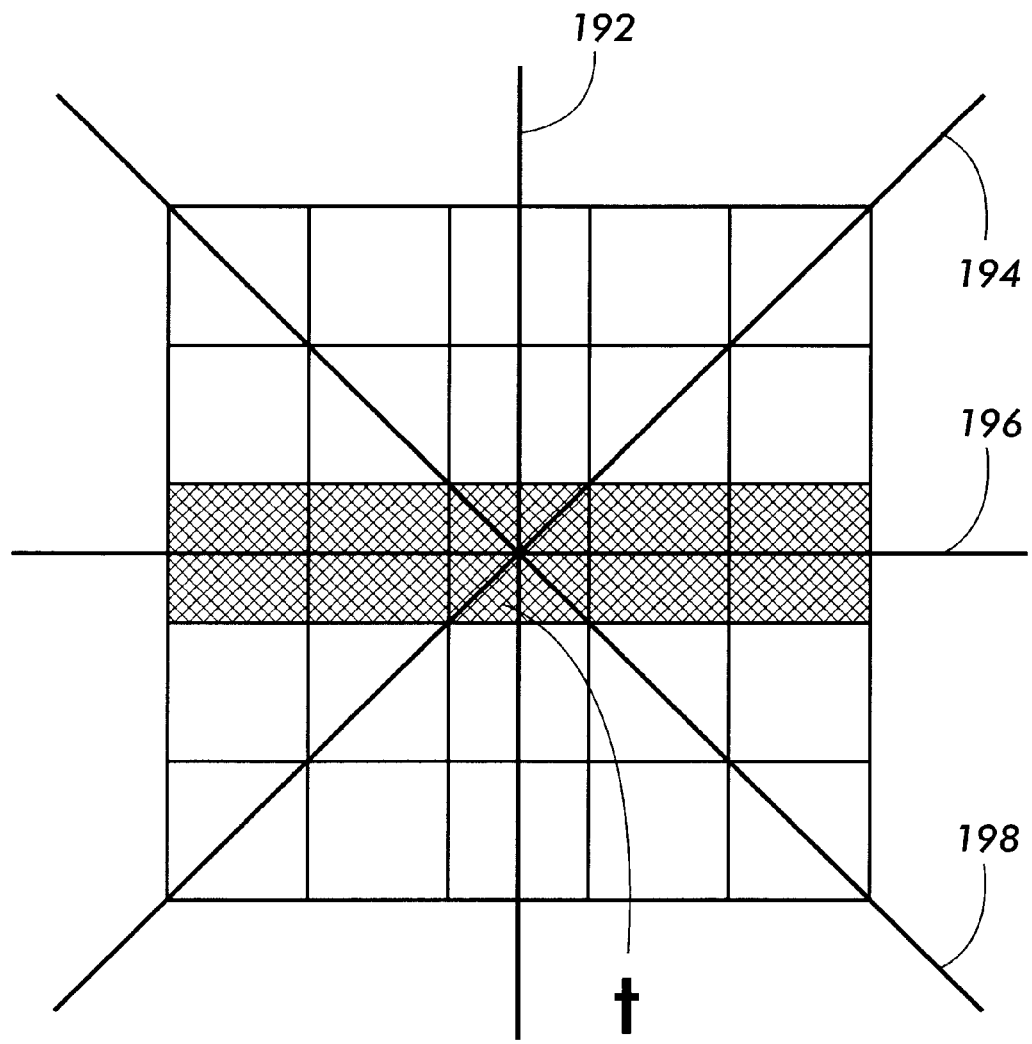
FIG. 9 shows a tagging scheme for thin gray lines that are gray due to antialiasing.

Unconstrained antialiasing in the raster image processor (RIP) can yield two-pixel-wide gray lines where the PDL stroke width was less than two and the color was saturated black. For instance, this effect occurs with a super-resolution rasterization method that snaps vertical and horizontal strokes and positions to the super-resolution pixel grid (e.g., 2400 spi), not the native pixel resolution (600 spi). In the antialiasing process, a thin black line decomposed to 2400 spi may partly straddle two 600 spi rasters and thus be averaged down to gray values on both of those rasters. The Thin-Line-Detection method relies on background / non-background transitions to perform the tagging. Conceptually, the tagging algorithm preferably operates as follows:

1) Position a window (say, 5×5) about a target pixel (t);
2) Determine whether each pixel in the window possesses a background or nonbackground value. The background pixel value is predefined (e.g. near 0 or near 255), either via a setting established by the user or possibly using an automated background detection technique as are known in the art of digital image processing.
3) Look for background / nonbackground transitions along various cuts (angles, arcs or complex curves) in a window such as that depicted in FIG. 9, preferably along the center vertical column 192, center horizontal row 196, or both diagonal lines 194 and 198..
4) Count the number of transitions along each direction. If there are a predetermined number (preferably two) or more transitions along a predefined cut(s), then the target pixel (t) is tagged for AAR treatment; and
5) Then, combine the tags from this method with the tags generated using the high contrast neighbors method by ORing the tags. ] or, alternatively, combining the tags through a small look-up table Note that additional testing could be incorporated to prevent erroneous tagging. For instance, to better ensure that the identified gray structure is part of a stroke a check could be performed to determine if the nonbackground pixels were constant in at least one direction.

2.2 Tagging Implementation for a M×N Window

Figure 7:
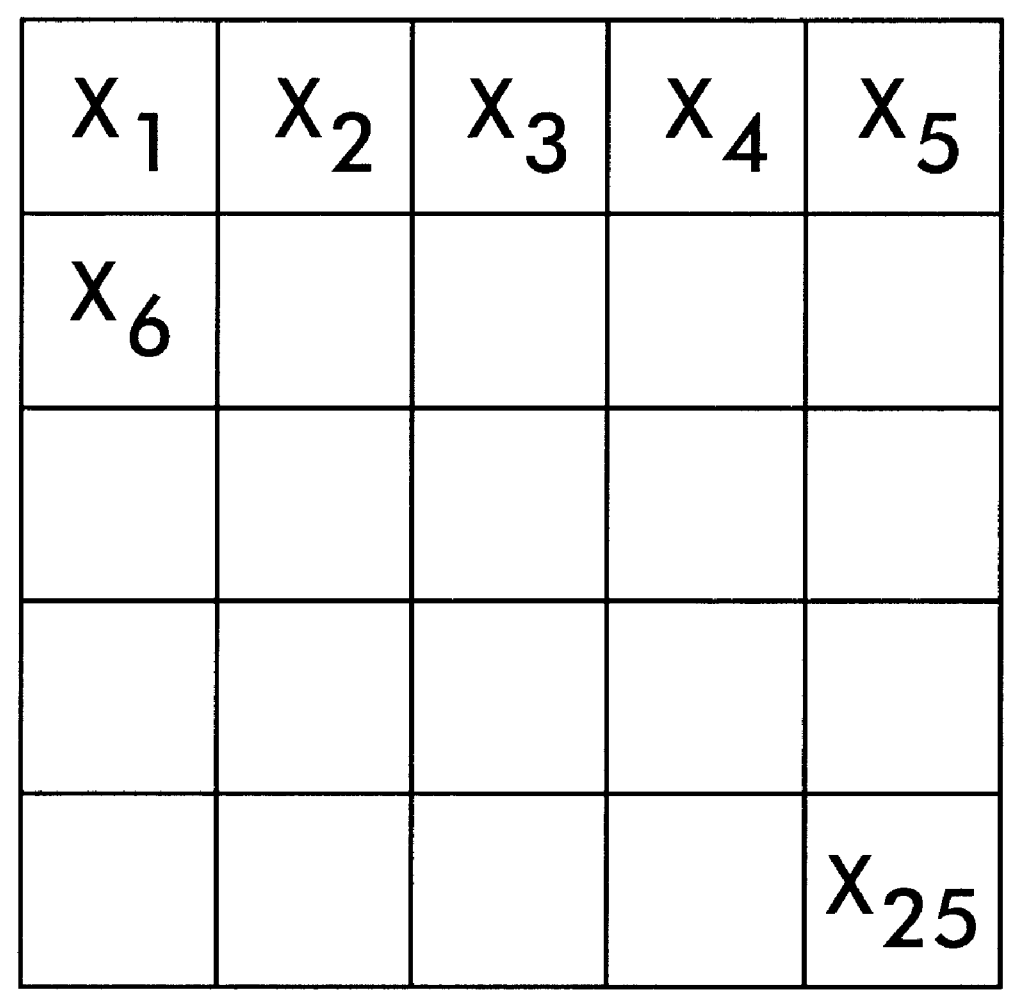

The method described below is not limited to a 5×5 window as depicted in FIG. 7, however, it has been empirically determined that 5×5 is the minimum size required for thin gray line detection.

Distinguishing between background and nonbackground pixels:

Define a logical variable $F_n$, where $F_n$ is 1 or 0 if the $n^{th}$ pixel within the window pixel is a background pixel or it is not, respectively. For background defined as 0, $$F_n = (x_{n,1} + x_{n,2} + \Lambda x_{n,8})^c. \tag{5}$$

Determine the respective $F_n$ values for all 25 pixels in the window.

Finding the number of transitions in each direction:

Define four 4-bit logical variable vectors H, V, $D_L$, and $D_R$, where H represents background/nonbackground transitions in the horizontal direction, V represents transitions in the vertical direction, $D_L$ represents transitions from the top left to bottom right, and $D_R$ represents the transitions from the top right to bottom left. Each bit in these 4-bit vectors is 1 or 0 if there is a transition or not, respectively.

$$H = [H_1, H_2, H_3, H_4] = [(F_{11} \Delta F_{12}), (F_{12} \Delta F_{13}), (F_{13} \Delta F_{14}), (F_{14} \Delta F_{15})] \tag{6}$$

$$V = [V_1, V_2, V_3, V_4] = [(F_3 \Delta F_8), (F_8 \Delta F_{13}), (F_{13} \Delta F_{18}), (F_{18} \Delta F_{23})] \tag{7}$$

$$D_L = [D_{L_1}, D_{L_2}, D_{L_3}, D_{L_4}] = [(F_1 \Delta F_7), (F_7 \Delta F_{13}), (F_{13} \Delta F_{19}), (F_{19} \Delta F_{25})] \text{ and} \tag{8}$$

$$D_R = [D_{R_1}, D_{R_2}, D_{R_3}, D_{R_4}] = [(F_5 \Delta F_9), (F_9 \Delta F_{13}), (F_{13} \Delta F_{17}), (F_{17} \Delta F_{21})] \tag{9}$$

Determine if there are more than two transitions per direction:

Define the logical variable $T_p$, where $T_p$ is 1 if there are at least 2 transitions in the P direction, or 0 otherwise. Let $$T_H = (H_1 + H_2 + H_3)(H_1 + H_3 + H_4)(H_1 + H_2 + H_4)(H_2 + H_3 + H_4). \tag{10}$$

$$T_V = (V_1 + V_2 + V_3)(V_1 + V_3 + V_4)(V_1 + V_2 + V_4)(V_2 + V_3 + V_4). \tag{11}$$

$$T_{D_L} = (D_{L_1} + D_{L_2} + D_{L_3})(D_{L_1} + D_{L_3} + D_{L_4})(D_{L_1} + D_{L_2} + D_{L_4})(D_{L_2} + D_{L_3} + D_{L_4}). \tag{12}$$

$$T_{D_R} = (D_{R_1} + D_{R_2} + D_{R_3})(D_{R_1} + D_{R_3} + D_{R_4})(D_{R_1} + D_{R_2} + D_{R_4})(D_{R_2} + D_{R_3} + D_{R_4}). \tag{13}$$

Determine if a pixel must be treated by AAR

Define a logical variable T, where T is 1 if there are two transitions along the center vertical or two transitions along the center horizontal, or two transitions along each of the diagonals.

$$T = T_H + T_V + (T_{D_L} T_{D_R}) \tag{14}$$

Other background/nonbackground transitions may also be used to identify a gray line within a background field. For example, an alternative criteria could simply require two transitions along each of any two cuts as represented by the following equation $$T = (T_H + T_V + T_{D_L})(T_H + T_{D_L} + T_{D_R})(T_H + T_V + T_{D_R})(T_V + T_{D_L} + T_{D_R}). \tag{14'}$$

Define a logical variable $AAR_2$ where $AAR_2$ is 1 or 0 if antialiased rendering is to be applied or not, respectively.

$$AAR_2 = GT. \tag{15}$$

Now, both the high-contrast-neighbors method and the thin-line-detection method can be combined to obtain a complete tagging of antialiased pixels.

$$AAR = AAR_1 + AAR_2 = GN_K N_W + GT \tag{16}$$

3. To determine the fill orientation for AAR

Fill orientation determination:

Each tagged pixel will be rendered (halftoned) with an appropriate cell. Pixels not recognized as antialiased pixels will be halftoned using the system dot, while high-resolution dots (e.g., 600 cpi) will be used for the antialiased pixels. Define four logical variables (tags) L, R, S, C that indicate the desired use of left, right, split, or center fill patterns, respectively, for halftoning antialiased pixels. It is further noted that one skilled in the art will recognize that fewer, or alternative, fill patterns may be employed. To determine the fill-order tag, the pixels within the window are first thresholded. From the thresholded values it is possible to obtain:

$$L = t_4 t_6^c. \tag{17}$$

$$R = t_4^c t_6'. \tag{18}$$

$$S = t_4 t_6. \tag{19}$$

$$C = t_4^c t_6^c. \tag{20}$$

where the $t_i$ are thresholded pixel values of the 3×3 window and "$^c$" means compliment (invert); $t_4$ is the thresholded pixel left of center and $t_6$ is the threshold pixel right of center. Note that the value of the center or target pixel is not needed in the calculations. Also, it will be appreciated that there is a need for a split fill to properly treat the inside angle of structures such as are found in the characters "Y" and "V." In a manner similar to that described above, look-up tables or templates may be used in place of the simple logic shown here in Eq. (17)–(20). The look-up table, logic, or templates may use more neighboring pixels to form the decision on filling from the left, right, center, or split. For instance, corner pixels within the 3×3 window have been found to be useful in selecting the fill orientation for gray pixels that border diagonal lines. It will be appreciated by those skilled in the art that a tagging architecture such as that depicted in FIGS. 4 and 6, but using more neighboring pixels, may be used to select the fill orientation.

Overall tagging scheme:

Tags for the five possible pixel render methods (4 AAR methods and 1 system halftone dot) can be formed from the information below:

$$\text{Left Fill for AAR: (AAR)(L)} \tag{21}$$

$$\text{Right Fill for AAR: (AAR)(R)} \tag{22}$$

$$\text{Split Fill for AAR: (AAR)(S)} \tag{23}$$

$$\text{Center Fill for AAR:(AAR)(C) and} \tag{24}$$

$$\text{System Halftone: (AAR)}^c \tag{25}$$

Figure 8:
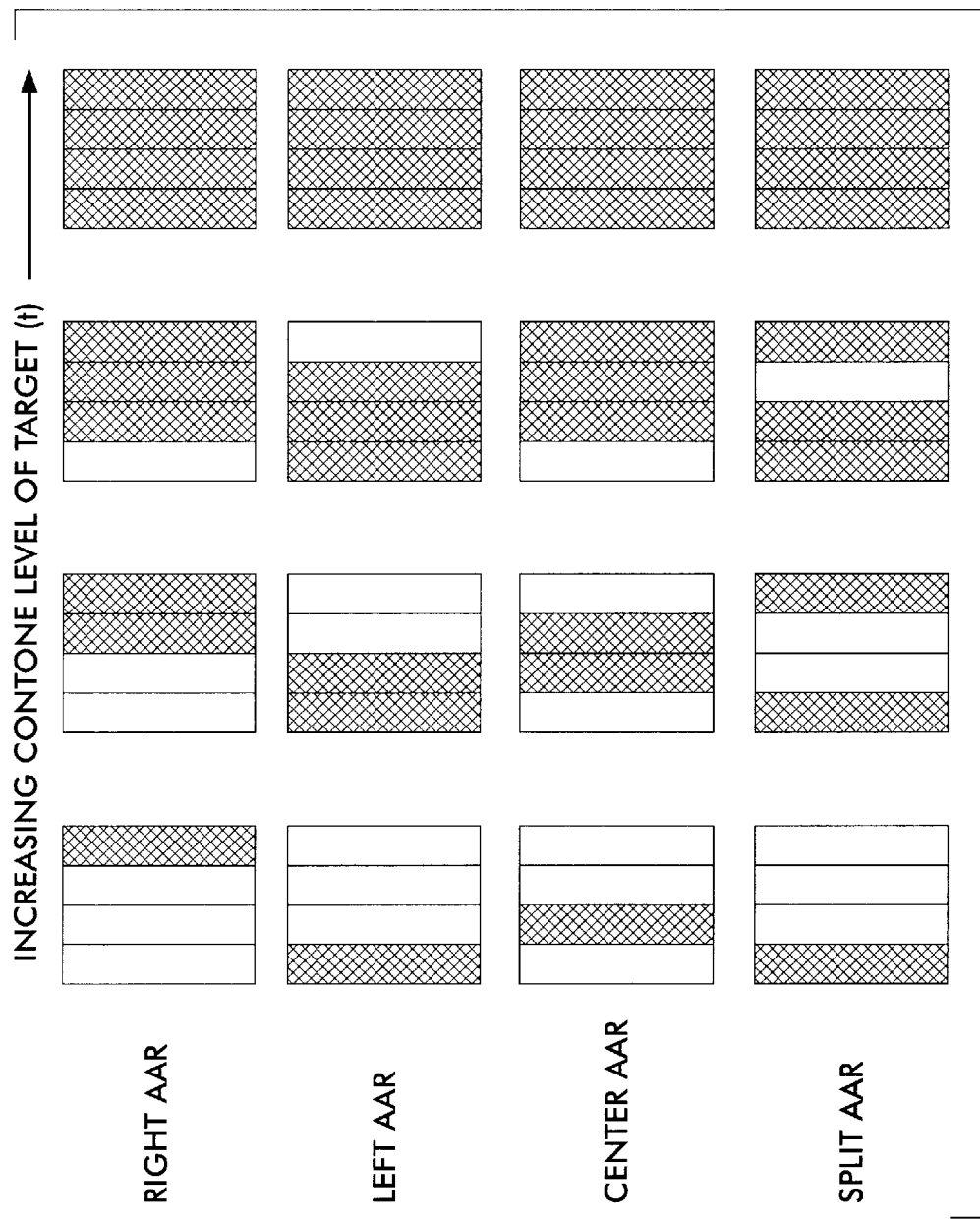
FIG. 8 shows one collection of possible rendering signals for pixels that where tagged as antialiased.

If the tag must be limited to only two bits of information, it is possible to eliminate use of either the split fill or center fill. If the tag is limited to but a single bit, it is preferred to limit the rendering options to the system halftone dot and the center fill or split fill AAR halftone. FIG. 8 is an illustration of one set of possible imaging dots that may be created in one rendering embodiment (e.g., 4x high-addressable, fast scan resolution) of the present invention. As illustrated, for example in the left fill AAR situation, the pixel position is filled from the left using progressively (depending upon the contone level of the target pixel) wider exposure pulses until a pixel or image dot is completely filled. It will be further appreciated that alternative filling orders and/or higher pixel pulse resolution may be used as well.

Figure 10:
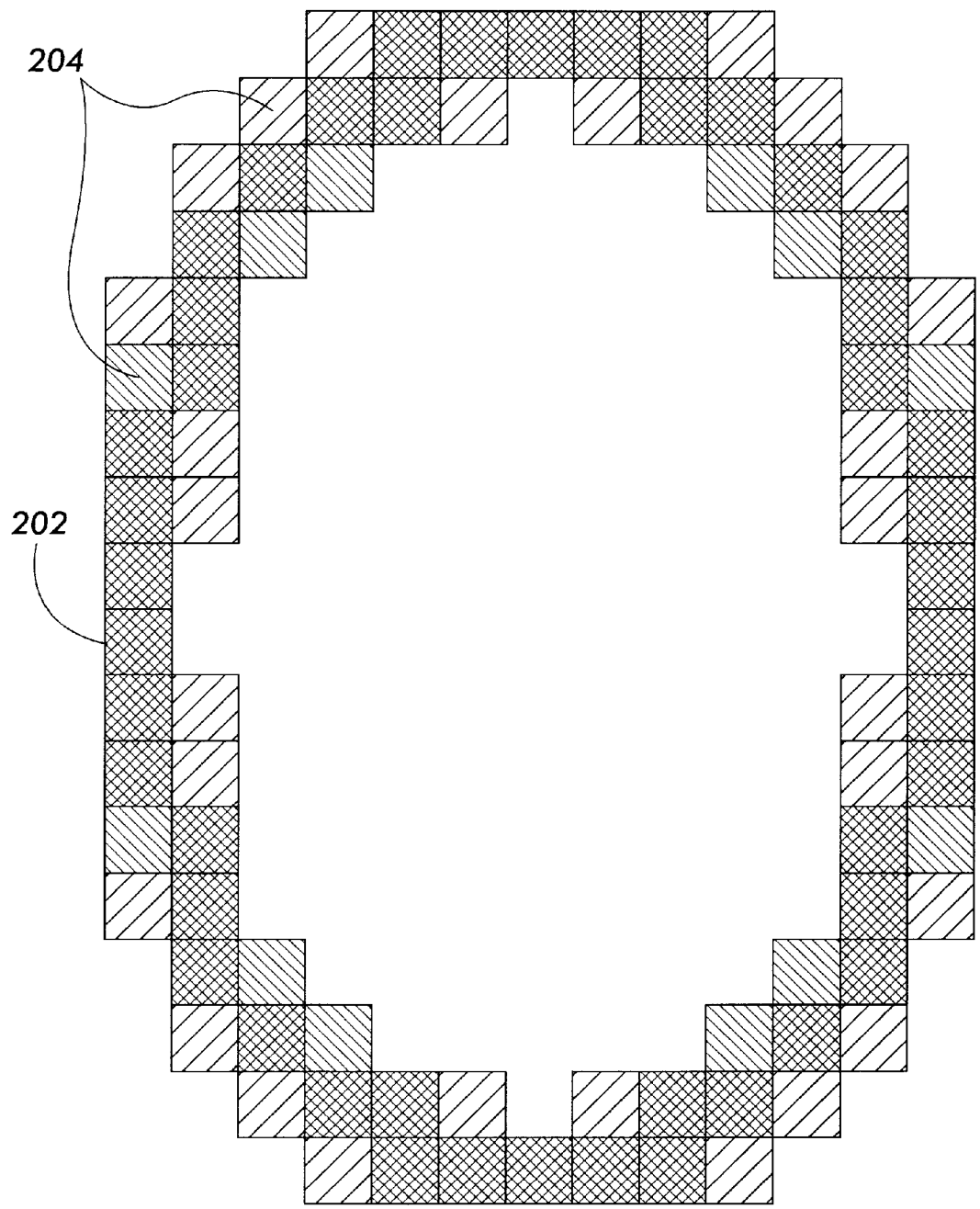
FIG. 10 shows an antialiased zero (0)
Figure 11:
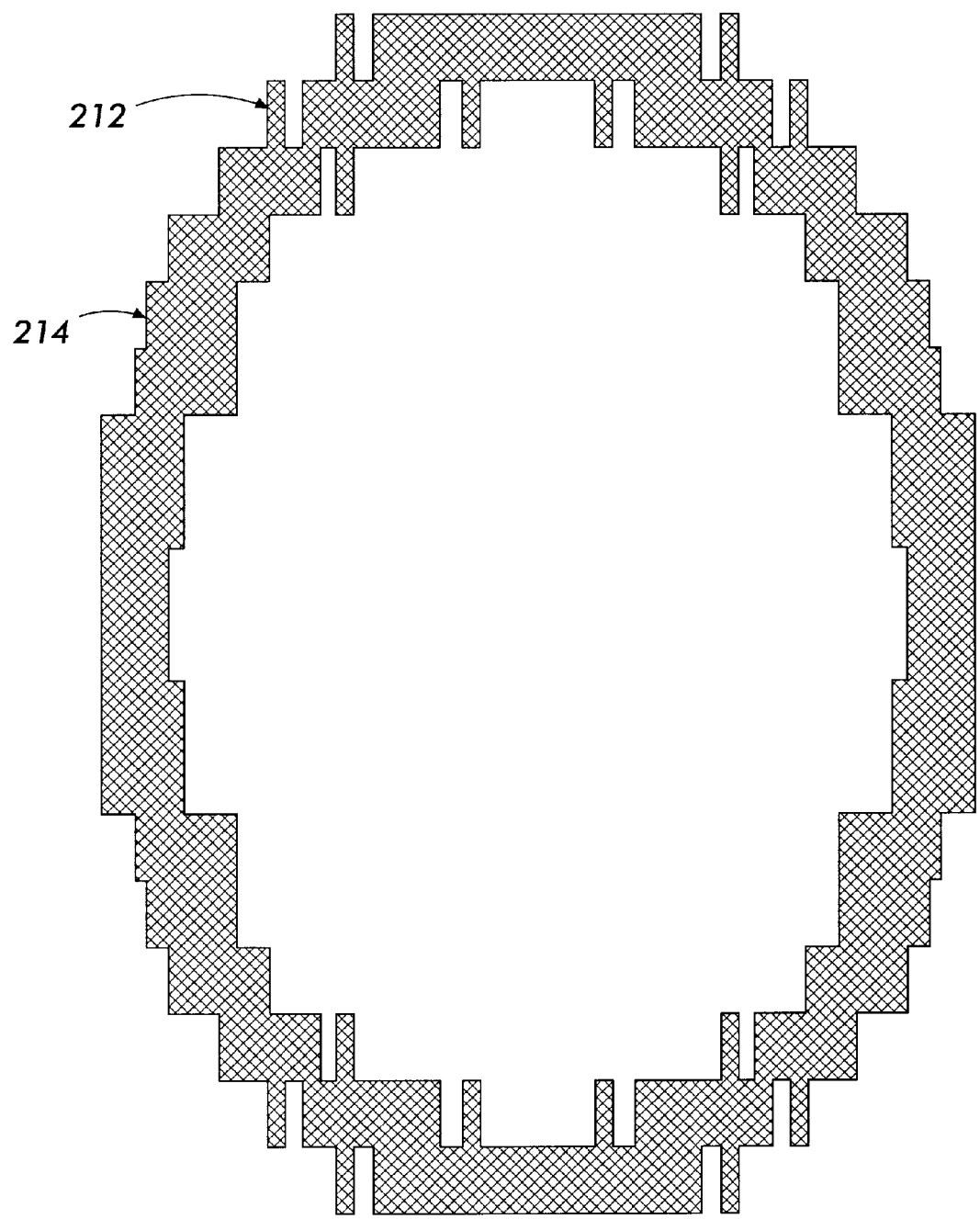
FIG. 11 shows the antialiased image of FIG. 10 after processing with antialiasing rendering signals.

Turning to FIGS. 10 and 11, displayed therein are highly magnified versions of an image containing the character "0". FIG. 10 depicts the character using saturated pixels 202 and anitialiased pixels 204. As will be appreciated from a reading of the description above, the antialiased pixels are employed to improve the rendition of the image (using gray), but cannot easily be reproduced in binary imaging devices. Accordingly, using the processing methods described herein to identify (tag) the antialiased pixels and then preferably render the pixels in a high addressability or high-frequency halftoning technique, the pixels corresponding to the antialiased pixel positions in FIG. 10 can be seen in FIG. 11 as comprising a high-addressability output, where the size and location of the pixel "on" pulse is controlled as characterized above. For example, the output in regions 212 and 214 show partial pixel pulses that are centered and shifted respectively.

In recapitulation, the present invention is a method for antialiased rendering (AAR). First, tagging methods for identifying antialiased pixels were described, the methods being employed separately or in concert with one another. After identifying antialiased pixels, a fill order is determined and applied using a fill order algorithm that preferably employs a pixel window that is a subset of the larger window employed for pixel identification.

It is, therefore, apparent that there has been provided, in accordance with the present invention, a method for enabling the printing of antialiased images. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. The method for processing an image including antialiased pixels therein, comprising the steps of:

determining if a target pixel has been antialiased;

indicating whether the target pixel has been antialiased by a tag; and determining an appropriate rendering technique for each target pixel as a function of the tag;

wherein the step of determining an appropriate rendering technique is accomplished as a function of the tag, the pixel value and a marking process characteristics.

2. The method for processing an image including antialiased pixels therein, comprising the steps of:

determining if a target pixel has been antialiased;

indicating whether the target pixel has been antialiased by a tag; and determining an approppriate rendering technique for each target pixel as a function of the tag;

wherein the step of determining if a target pixel has been antialiased includes tagging target pixels that are gray pixels with high-contrast neighboring pixels.

3. The method of claim 2, wherein the step of tagging target pixels that are gray pixels with high-contrast neighboring pixels further comprises:

positioning an observation window about the target pixel;

determining if the target pixel possesses both types of saturated neighbors within that window; and if both saturated neighbors are present, tagging the target pixel for antialiased rendering.

4. The method of claim 3, wherein the observation window is a window of M ×N, wherein M and N are integer values greater than two.

5. The method for processing an image including antialiased pixels therein, comprising the steps of:

determining if a target pixel has been antialiased;

indicating whether the target pixel has been antialiased by a tag: and determining an appropriate rendering technique for each target pixel as a function of the tag;

wherein the step of determining if a target pixel has been antialiased includes tagging any target pixel that is part of a thin, gray antialiased line.

6. The method of claim 5, wherein the step of tagging a target pixel within a thin, gray, antialiased line, comprises the steps of:

positioning an observation window about a target pixel, said observation window defining the neighbors of the target pixel;

determining whether each pixel in the observation window possesses a background or nonbackground value, wherein the background pixel value is a predefined level near saturation identifying background/nonbackground transitions along a cut through the observation window, wherein a transition represents a change between a background pixel and a non-background pixel;

counting the number of the transitions along each of the plurality of angular directions; and if there are at least a predetermined number of transitions along a cut, then tagging the target pixel for antialiased rendering.

7. The method of claim 6, wherein the observation window is a window of M ×N, wherein M and N are integer values, one of which is greater than four.

8. The method of claim 6, wherein the predefined level is a level established by a user.

9. The method of claim 6, wherein the predefined level is determined using an automated background detection technique.

10. The method of claim 6, wherein the predetermined number of transitions is at least two.

11. The method of claim 10, wherein a cut includes at least two curves dividing the observation window.

12. The method for processing an image including antialiased pixels therein, comprising the steps of:

determining if a target pixel has been antialiased;

indicating whether the target pixel has been antialiased by a tag; and determining an appropriate rendering technique for each target pixel as a function of the tag;

wherein the step of determining if a target pixel has been antialiased includes the steps of:

tagging target pixels that are gray pixels with high-contrast neighboring pixels to generate a first tag;

tagging any target pixel that is part of a thin, gray antialiased line to generate a second tag; and.

combining the first and second tags by ORing the tags.

13. The method for processing an image including antialiased pixels therein comprising the steps of:

determining if a target pixel has been antialiased;

indicating whether the target pixel has been antialiased by a tag; and determining an appropriate rendering technique for each target pixel as a function of the tag;

wherein the step of determining an appropriate rendering technique comprises the steps of:

rendering each target pixel tagged as an antialiased pixel with a predetermined rendering technique, and otherwise rendering target pixels using a conventional halftoning technique.

14. The method of claim 13, wherein the step of rendering each target pixel tagged as an antialiased pixel with a predetermined rendering technique further comprises the steps of:

determining the positioning order for each high addressability output pixel to be employed for rendering the target pixel as a function of the tag; and determining the number of high addressability pixels to output for the target pixel.

15. The method of claim 13, wherein the step of rendering each target pixel tagged as an antialiased pixel with a predetermined rendering technique further comprises the steps of:

determining the positioning order for each pulse-width modulated signal to be employed for rendering the target pixel as a function of the tag; and determining the width of a pulse-width signal for the target pixel.

16. The method of claim 14, wherein the step of determining the positioning order is accomplished in accordance with a method selected from the group consisting of:

a) using a centroid of black and white pixels about the antialiased target pixel to determine if edges tend toward a quadrant boundary (vertical or horizontal), and if so ,and the antialiased pixel is adjacent a near vertical edge, then requiring that the pixel event is shifted toward the edge, or the antialiased pixel is adjacent a near horizontal edge, then requiring that the pixel event is shifted toward center;

b) using neighboring pixel information, shifting pulses away from gray pixels; and c) using logic equations to identify special patterns and respective output positions.

17. The method of claim 16, wherein the step of using logic equations comprises:

converting the neighboring pixel levels into a vector, and passing the vector through a set of logic templates reflective of the logic equations, the output thereof indicating the positioning order.

18. The method of claim 16, wherein the step of using logic equations comprises:

converting the neighboring pixel levels into an index value, and passing the index value to a look-up table programmed in accordance with the logic equations, the output thereof indicating the positioning order.

19. The method of claim 14, wherein the resulting tag is selected from a first group of tags, each associated with a particular rendering method, said group consisting of:

Left Fill;

Right Fill;

Split Fill;

Center Fill; and

System Halftone.

20. The method of claim 19, wherein the resulting tag is limited to a maximum of three bits, and wherein the group of possible rendering methods is a subset of said first group.

21. In a printing system, receiving document images including both text / line art regions, and pictorial regions, a method for optimizing a rendition thereof, comprising the steps of:

receiving a document image representation in a form suitable for processing by an antialiasing processor;

processing the document image in a digital front end to produce antialiased pixels therein in order to improve the rendition of such images, said processing resulting in an image data stream consisting essentially of continuous tone image pixels; and subsequently processing the document image containing antialiased pixels therein in order to identify the antialiased pixels and to process the antialiased pixels in a manner distinct from any non-antialiased pixels, including the steps of determining if a target pixel has been antialiased, indicating whether the target pixel has been antialiased by a tag, and determining an appropriate rendering technique for each target pixel as a function of its tag;

wherein the step of determining an appropriate rendering technique is accomplished as a function of the tag, the pixel value and the marking process characteristics.

22. The method of claim 21, wherein the step of determining if a target pixel has been antialiased includes tagging target pixels that are gray pixels with high-contrast neighboring pixels.

23. The method of claim 22, wherein the step of tagging target pixels that are gray pixels with high-contrast neighboring pixels further comprises:

positioning an observation window about the target pixel;

determining if the target pixel possesses both types of saturated neighbors within that window; and if both saturated neighbors are present, tagging the target pixel for antialiased rendering.

* * * * *